US007905637B2

(12) United States Patent
Caluori et al.

(10) Patent No.: US 7,905,637 B2
(45) Date of Patent: Mar. 15, 2011

(54) TRANSFORMER ASSEMBLY AND LIGHT FIXTURE ASSEMBLY USING SAME

(75) Inventors: Giuseppe Caluori, Dollard-des-Ormeaux (CA); Howard Yaphe, Saint Laurent (CA)

(73) Assignee: Canlyte Inc., Lachine (CA)

( * ) Notice: Subject to any disclaimer, the term of this patent is extended or adjusted under 35 U.S.C. 154(b) by 255 days.

(21) Appl. No.: 12/361,763

(22) Filed: Jan. 29, 2009

(65) Prior Publication Data

US 2009/0244888 A1 Oct. 1, 2009

Related U.S. Application Data

(60) Provisional application No. 61/024,637, filed on Jan. 30, 2008.

(51) Int. Cl.
*B60Q 3/04* (2006.01)

(52) U.S. Cl. ........ 362/362; 362/147; 362/253; 362/364; 336/90; 336/94; 336/96; 336/105

(58) Field of Classification Search .................. 362/147, 362/253, 362, 364; 336/90, 94, 96, 105
See application file for complete search history.

*Primary Examiner* — Sandra L O Shea
*Assistant Examiner* — Meghan K Dunwiddie

(57) ABSTRACT

A potted transformer assembly comprises a housing portion to form an exterior transformer housing, a transformer unit dimensioned to fit within the housing portion, the housing portion including a first passage to receive the transformer unit in an operative position therein, the housing portion having an inner surface which is oriented to provide an interior cavity between the transformer unit and the inner surface, the interior cavity being dimensioned to receive a predetermined quantity of a potting compound, the housing portion further including a second passage in fluid communication with the interior cavity, the second passage being dimensioned to receive a portion of the potting compound therein, the second passage being located on the housing portion in such a manner that, following a transformer encapsulation step, the presence of potting compound in the second passage is indicative of the transformer being substantially encapsulated by the potting compound.

16 Claims, 6 Drawing Sheets

TRANSFORMER ASSEMBLY AND LIGHT FIXTURE ASSEMBLY USING SAME

CROSS-REFERENCE TO RELATED APPLICATIONS

The entire subject matter of U.S. Provisional application Ser. No. 61/024,637 filed Jan. 30, 2008 and entitled TRANSFORMER ASSEMBLY AND LIGHT FIXTURE ASSEMBLY USING SAME is incorporated by reference. The applicants claim priority benefit under Title 35, United States Code, Section 119 of U.S. Provisional application Ser. No. 61/024,637 filed Jan. 30, 2008 and entitled TRANSFORMER ASSEMBLY AND LIGHT FIXTURE ASSEMBLY USING SAME.

STATEMENT REGARDING FEDERALLY SPONSORED RESEARCH OR DEVELOPMENT

Not applicable.

REFERENCE TO A "SEQUENTIAL LISTING," A TABLE, OR A COMPUTER PROGRAM LISTING APPENDIX SUBMITTED ON A COMPACT DISC

Not applicable.

FIELD OF THE INVENTION

The present invention relates to potted transformers and methods of forming same.

DESCRIPTION OF THE RELATED ART

Transformers are widely used in power supplies. In some cases, the transformer is "potted" to provide protection and to suppress noise, though there are limitations to current potting techniques. Transformers are commonly used in products such as light fixtures for supplying power to the light source and associated hardware. However, conventional potted transformers are believed to present limitations to some light fixture applications.

BRIEF DESCRIPTION OF THE DRAWINGS

Several preferred embodiments of the present invention will be provided, by way of examples only, with reference to the appended drawings, wherein.

DESCRIPTION OF THE PREFERRED EMBODIMENTS

Figure 1:
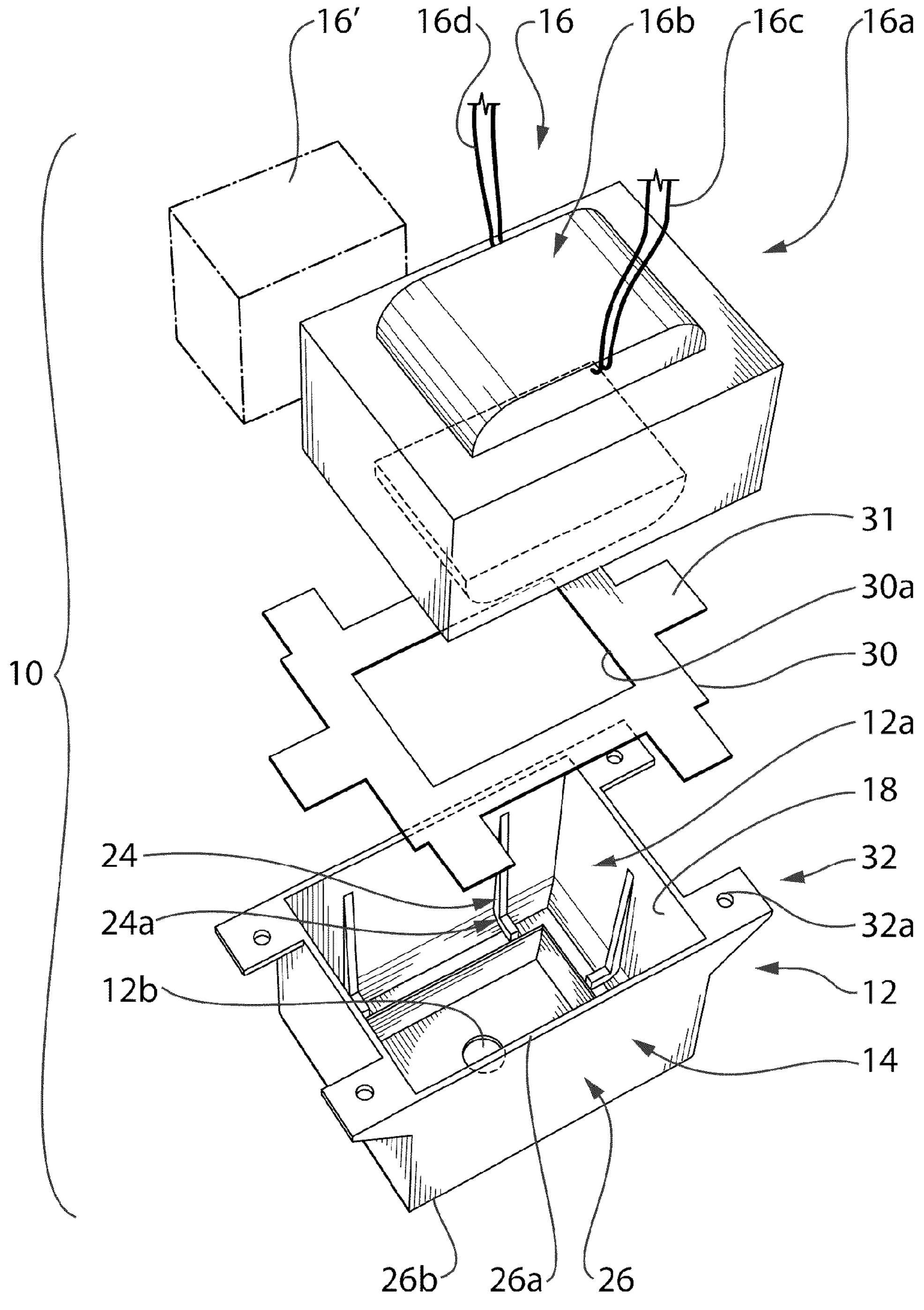
FIG. 1 is an assembly view of a transformer assembly.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention. However, other alternative mechanical configurations are possible which are considered to be within the teachings of the instant disclosure. Furthermore, unless otherwise indicated, the term "or" is to be considered inclusive.

In one embodiment, there is provided a potted transformer assembly comprising a housing portion to form an exterior transformer housing. A transformer unit is dimensioned to fit within the housing portion. The housing portion includes a first passage to receive the transformer unit in an operative position therein. The housing portion has an inner surface which is oriented to provide an interior cavity between the transformer unit and the inner surface. The interior cavity is dimensioned to receive a predetermined quantity of a potting compound. The housing portion further includes at least one second passage in fluid communication with the interior cavity, the second passage being dimensioned to receive a portion of the potting compound therein. The second passage is located on the housing portion in such a manner that, following a transformer encapsulation step, the presence of potting compound in the second passage is indicative of the transformer being substantially encapsulated by the potting compound.

In one embodiment, the inner surface is oriented so that the housing portion is capable of receiving at least two different sizes of transformer units. The inner surface is oriented so that the housing portion is capable of receiving a first transformer unit operable to transform about 50VA of power or a second transformer unit operable to transform about 75VA of power. The housing portion may be formed by a molding or a casting step, such as a die casting step, using an aluminum material for minimizing magnetic vibration noise.

In one embodiment, the housing portion includes a closed peripheral side wall portion, the side portion including a first edge region bordering the first passage and a second edge region, an end wall portion joined to the side wall portion at the second edge region, the second passage being centrally located in the end wall portion.

In one embodiment, the transformer includes a transformer body with a pair of opposed windings portions extending laterally outwardly from the transformer body, the end wall portion providing a centrally located depression to receive one of the windings portions therein, the second passage being centrally located in the depression. A plurality of guiding members extend inwardly from both the side wall portion and the end wall portion to provide a plurality of shoulder portions to support the transformer body.

An embodiment further comprises a gasket member to be located between the transformer body and the shoulder portions, the gasket member and/or the inner surface being dimensioned to provide a plurality of third passages to transfer potting material from the first passage through the inner cavity to the second passage. The housing portion has a plurality of external flanges extending outwardly from the housing, each arranged to receive a fastener therethrough for anchoring the assembly to a light fixture.

Another embodiment provides a light fixture comprising a light housing, a power supply assembly to supply power to the light housing and a frame portion supporting the light housing and the power supply assembly, the power supply assembly including a potted transformer assembly including a housing portion to form an exterior transformer housing, a transformer unit dimensioned to fit within the housing portion, the housing portion including a first passage to receive the transformer unit in an operative position therein, the housing portion having an inner surface which is oriented to provide an interior cavity between the transformer unit and the inner surface, the interior cavity being dimensioned to receive a predetermined quantity of a potting compound, the housing portion further including a second passage in fluid communication with the interior cavity, the second passage being dimensioned to receive a portion of the potting compound therein, the second passage being located on the housing portion in such a manner that, following a transformer encapsulation step, the presence of potting compound in the second passage is indicative of the transformer being substantially encapsulated by the potting compound.

In an embodiment, the frame portion includes an elongate flexible frame member extending laterally outwardly from the light housing along a first axis, the elongate flexible frame member including a proximal end region joined to the light housing and a distal end region, a junction box mounted to the distal end region.

In an embodiment, the elongate flexible frame member includes a first elongate boundary and an opposed second elongate boundary. An expandable channel extends between the light housing and the junction box along the first elongate boundary, the transformer being mounted adjacent the second elongate boundary.

In an embodiment, the junction box has a first region lying adjacent the distal end region and a second region lying remote from the distal end region. The junction box has a first surface in the direction of the light housing, the first region having a first dimension aligned with the first axis, the second region having a second dimension aligned with the first dimension. The second dimension is smaller than the first dimension to provide the first surface with a stepped configuration to form a locating region bordered on two sides by the first surface.

In an embodiment, the junction box is dimensioned so that the second surface lies adjacent an upper surface of a ceiling panel in an operative configuration, the junction box including a layer of resilient material mounted on the second surface to cushion the junction box in the operative position. In one embodiment, the junction box includes a wall portion adjacent the locating region, further comprising a thermo sensor extending from the wall portion into the locating region.

In an embodiment, the transformer unit is located on the flexible frame member and immediately adjacent the junction box.

In an embodiment, the junction box has a side wall which is pivotally mounted for movement between a closed position and an open position.

Another embodiment provides an arrangement for fabricating a plurality of models of a potted transformer with each model operable for transforming a corresponding level of input power, comprising a group of two or more generic housing portions, a first group of one or more transformer units operable for transforming a first level of input power and dimensioned to fit within the generic housing portions of the group of two or more generic housing portions, a second group of one or more transformer units operable for transforming a second level of input power and dimensioned to fit within the generic housing portions of the group of two or more generic housing portions, each generic housing portion including a first passage to receive a selected transformer unit from the first and second groups in an operative position therein, each generic housing portion having an inner surface which is oriented to provide an interior cavity between the selected transformer unit and the inner surface, the interior cavity being dimensioned to receive a predetermined quantity of a potting compound, the housing portion further including a second passage in fluid communication with the interior cavity, the second passage being dimensioned to receive a portion of the potting compound therein, the second passage being located on the housing portion in such a manner that, after a transformer encapsulation step, the presence of potting compound in the second passage is indicative of the selected transformer being substantially encapsulated by the potting compound.

In yet another embodiment, there is provided a method of forming a potted transformer assembly, comprising providing a transformer unit; providing a housing portion with a first passage to receive the transformer unit in the cavity and to receive a quantity of potting compound to encapsulate the transformer unit, the housing portion having a second passage distal to the first passage for egress of the potting compound; depositing the transformer into the cavity through the first passage; depositing the quantity of potting compound into the cavity through the first passage to substantially encapsulate the transformer unit; and inspecting the second passage for the presence of potting compound therein.

Yet another embodiment provides a light fixture comprising a light fixture, a power supply assembly to supply power to the light fixture and a frame portion supporting the power supply assembly, the power supply assembly including a potted transformer assembly including a housing portion to form an exterior transformer housing, a transformer unit dimensioned to fit within the housing portion, the housing portion including a first passage to receive the transformer unit in an operative position therein, the housing portion having an inner surface which is oriented to provide an interior cavity between the transformer unit and the inner surface, the interior cavity being dimensioned to receive a predetermined quantity of a potting compound, the housing portion further including a second passage in fluid communication with the interior cavity, the second passage being dimensioned to receive a portion of the potting compound therein, the second passage being located on the housing portion in such a manner that, following a transformer encapsulation step, the presence of potting compound in the second passage is indicative of the transformer being substantially encapsulated by the potting compound.

In an embodiment, the frame portion includes a base plate to be substantially parallel with ceiling panel in an operative position, the base plate having an access passage to provide access to the light fixture, the power supply assembly including a junction box adjacent the access passage, the junction box having a pair of opposed side walls, a first proximal side wall and a second distal side wall, the transformer assembly being mounted adjacent the second distal side wall, the junction box including a top wall between the first and second side walls.

An embodiment further comprises a mounting plate, the transformer unit being positioned on the mounting plate, the mounting plate having a first edge region with a side wall portion depending therefrom, the side wall being positioned on the top wall. The mounting plate has a second edge region opposite the first edge region, further comprising an anchor lip extending along the second distal side wall to receive the second edge region to retain the mounting plate in position against the second distal side wall. The mounting portion includes a plurality of first anchor formations to engage corresponding second anchor formations on the top wall. The first anchor formations includes passages, the second anchor formations including threaded fasteners extending outwardly from the top wall to receive complementary fasteners secured thereto. The access passage is dimensioned to receive the transformer unit therethough. The proximal side wall is removably mounted on the junction box for manual removal therefrom by accessing the proximal side wall through the access passage.

Another embodiment provides a method of servicing a light fixture installation, comprising:

- providing a light fixture with a power supply assembly to supply power to the light fixture and a frame portion supporting the power supply assembly,
- providing a base plate with having an access passage to provide access to the light fixture,
- providing the power supply assembly with a first potted transformer unit which is dimensioned to pass through the access passage;
- providing the power supply assembly with a junction box placed adjacent the access passage, the junction box having a top wall, a removable first side wall which is proximal to the access passage and a second opposed side wall distal to the access passage,
- mounting the first potted transformer unit adjacent the second distal side wall, the junction box including a top wall between the first and second side walls;
- installing the frame portion between adjacent ceiling joists so that the base plate is substantially parallel with an adjacent ceiling surface,
- coupling a light source with the power supply and installing a light source through the access passage in order to operate the light fixture;
- and when the first potted transformer unit is to be replaced:
- manually reaching through the access passage to a region above the base plate containing the junction box;
- removing the first side wall to separate the electrical connections between the first potted transformer unit and the junction box;
- accessing the region of the junction box adjacent the top wall or second side wall to disconnect the first potted transformer unit from the junction box,
- negotiating the first potted transformer unit through the access passage;
- providing a replacement second potted transformer unit;
- negotiating the second potted transformer unit through the access passage;
- accessing the region of the junction box adjacent the top wall or second side wall to connect the second potted transformer unit from the junction box,
- with the first side wall removed, accessing the junction box through the region of to establish an electrical connection between the second potted transformer unit and the junction box; and
- removably coupling the first side wall to the junction box.

Referring to the figures, particularly FIG. 1, there is provided a potted transformer assembly 10 comprising a housing portion 12 to form an exterior transformer housing 14. A transformer unit is shown schematically at 16 and is dimensioned to fit within the housing portion 12. The housing portion 12 includes a first passage **12*a* to receive the transformer unit 16 in an operative position therein, as shown in FIG. 2**.

Figure 3:
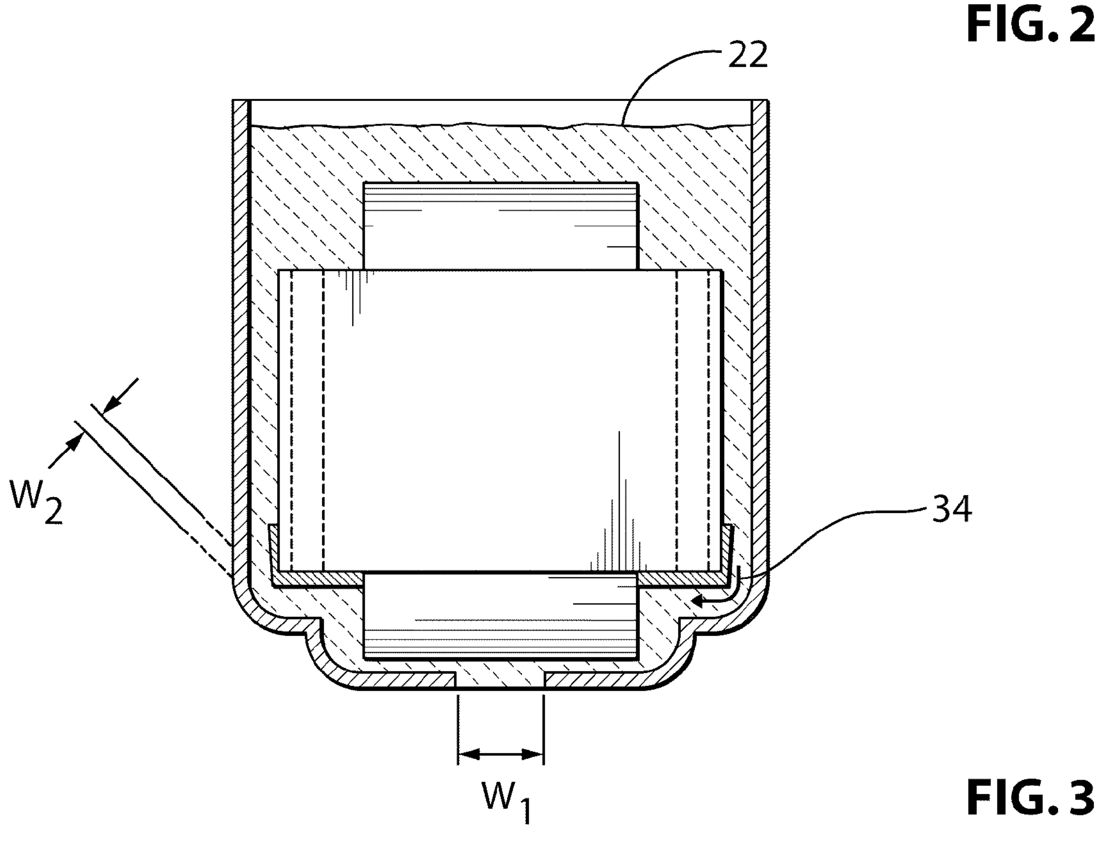

The housing portion 12 also has an inner surface 18 which is oriented to provide an interior cavity 20 between the transformer unit 16 and the inner surface 18. The interior cavity 20 is dimensioned to receive a predetermined quantity of a potting compound 22 (FIG. 3). The potting compound 22 may be selected while taking into account the dimensions of the inner cavity 20 and the materials used in the forming of the housing portion 12 and the transformer unit 16, so that that the potting compound 22 is readily bondable with both. For example, suitable potting compounds may be thermoset materials such as those available under the trade names epoxy, acrylic, polyester, silicone and urethane, among other possible materials.

Figure 2:
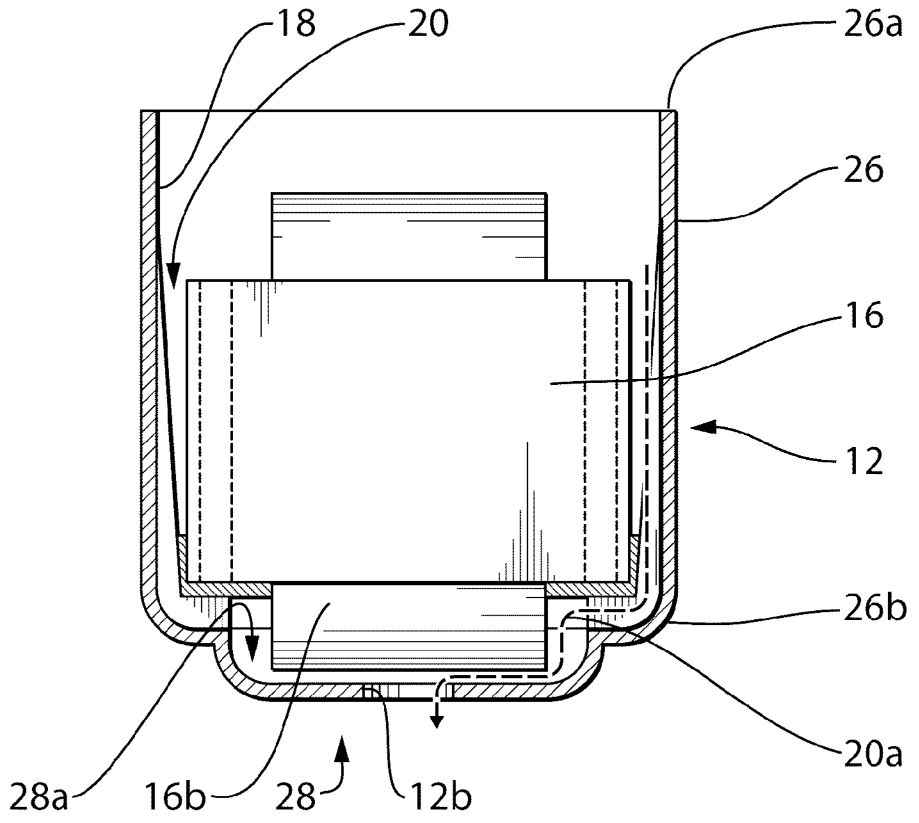
FIGS. 2 and 3 are part-sectional side views of the transformer assembly of FIG. 1.

The housing portion 12 further includes at least one second passage **12*b* in fluid communication with the interior cavity 20 (as shown by the chain dotted line and arrow 20*a*, shown in FIG. 2, through the second passage 12*b*). The second passage 12*b* is dimensioned to receive a portion of the potting compound therein along a path according to chain dotted line 20*a* and is located on the housing portion 12 in such a manner that, following a transformer encapsulation step, the presence of potting compound 22 in the second passage 12*a* is indicative of the transformer being substantially encapsulated by the potting compound 22**.

The second passage **12*a* provides the benefit of providing the user with a rapid indication of a suitably complete filling of the inner cavity of the housing portion. For instance, where the passage is fully filled, a quality assurance decision may be taken that the housing is fully potted, therefore passing a first stage of a quality review. If, on the other hand, if the second passage 12*b* is not fully filled, that feature alone may be sufficient to reject the transformer assembly 10**.

In this particular example, the inner surface 18 is further oriented so that the housing portion 12 is capable of receiving at least two different sizes of transformer units 16. For instance, the inner surface is oriented so that the housing portion is capable of receiving two or more such transformer units, for instance a first transformer unit operable to transform about 50VA of power or a second transformer unit operable to transform about 75VA of power. This is schematically represented by the additional transformer unit shown at 16' in FIG. 1, for a total of two possible transformer units in this example, though more than two may also be provided as desired.

In this example, the housing portion 12 is formed by a either molding or a casting step, though other fabrication techniques may also be employed either in conjunction with or as an alternative to molding and or casting, such as by using aluminum, zinc or bronze or other suitable alloys, or plastic materials such as high density polyethylenes. In one example, the housing portion 12 is formed by a die casting step, using an aluminum material for minimizing magnetic vibration noise.

The housing portion 12 includes a plurality of guiding members 24 for guiding the transformer unit 16 to a central operable position relative to the interior cavity 20. The housing portion 12 has a closed peripheral side wall portion 26, with a first edge region **26*a* bordering the first passage 12*a* and a second edge region 26*b*. An end wall portion 28 is joined to the side wall portion 26 at the second edge region 26*b* and the second passage 12*b* is centrally located in the end wall portion 28**.

The transformer unit 16 includes a transformer body **16*a* with a pair of opposed windings portions 16*b* extending laterally outwardly from the transformer body 16***a*, and two sets of leads 16*c*, 16*d*. The end wall portion 28 provides a centrally located depression 28*a* to receive one of the windings portions 16*b* therein (FIG. 2), with the second passage 12*b* being centrally located in the depression 28*a*.

Referring to FIG. 1, the guiding members 24 extend inwardly from both the side wall portion 26 and the end wall portion 28 to provide a plurality of shoulder portions 24*a* to support the transformer body 16*a*. A gasket member 30 is located between the transformer body 16*a* and the shoulder portions 24*a*. The gasket member 30 has an inner peripheral region 30*a* providing a passage which is dimensioned to receive a corresponding windings portion 16*b*. The gasket member 30 and/or the inner surface 18 are, in this case, dimensioned to provide a plurality of third passages 34 coinciding with the path 20*a* to transfer potting compound 22 from the first passage through the inner cavity to the second passage. The gasket member 30 has a peripheral region beyond which extend a plurality of fingers 31. Each finger 31 is positioned to align with a corresponding guiding member 24. It will be seen that the gasket member 30, in the region of the fingers 31, flexes or bends to substantially isolate the transformer unit 16 from the housing portion 12, that is with essentially no metal to metal contact therebetween in order that the gasket member 30 can provide some absorption of transformer vibration, thereby acting to reduce the transmission of noise beyond the housing portion 12.

The housing portion 12 may be provided with at least one exterior mounting formation 32 for anchoring the assembly to a light fixture. In this case, the exterior mounting formation includes a plurality of external flanges 32*a* extending outwardly from the housing portion 12, each flange 32*a* arranged to receive a fastener therethrough (not shown) for anchoring the transformer assembly 10, as will be described.

The transformer assembly 10 may be formed as follows. First, the gasket may be installed on an inward windings portion 16*b* with the fingers 31 oriented to align with the corresponding guiding members 24. The transformer unit 16 and gasket member 30 subassembly may then be installed though the first passage 12*a* of the housing portion 12 until it comes to rest on the shoulder portions 24*a* of the guiding members 24. The potting compound 22 may then be poured into the housing portion, over the transformer unit 16 and along the third passages 34 until the potting compound 22 fully covers the windings portion 16*b* adjacent the opening first passage 12*a*.

Alternatively, the potting compound 22 may be poured into the housing portion 12 to an intermediate level, such as a level approximating the shoulder portions 24*a*. The subassembly of the transformer unit 16 and the gasket member 30 may then be inserted in the housing portion 12 with the lower windings portion 16*b* being pressed into the potting compound. Thereafter, the potting compound may be poured into the housing portion, over the transformer and along the third passages 34 until the potting compound fully covers the windings portion 16*b* adjacent the opening first passage 12*a*.

Thus, the passages 12 may provide an indicator, and in some cases a limited guarantee for an end user that the transformer is fully encapsulated, through substantially the entire housing, thereby providing a quality check point. If the hole is not fully filled, the transformer may be rejected be used to establish to a supplier that the transformer was not property potted, or to show that a potting step is incomplete. If desired, the passage 12*b* may have a width dimension that exceeds the maximum distance between the transformer and the neighbouring portion of the housing portion.

Figure 4:
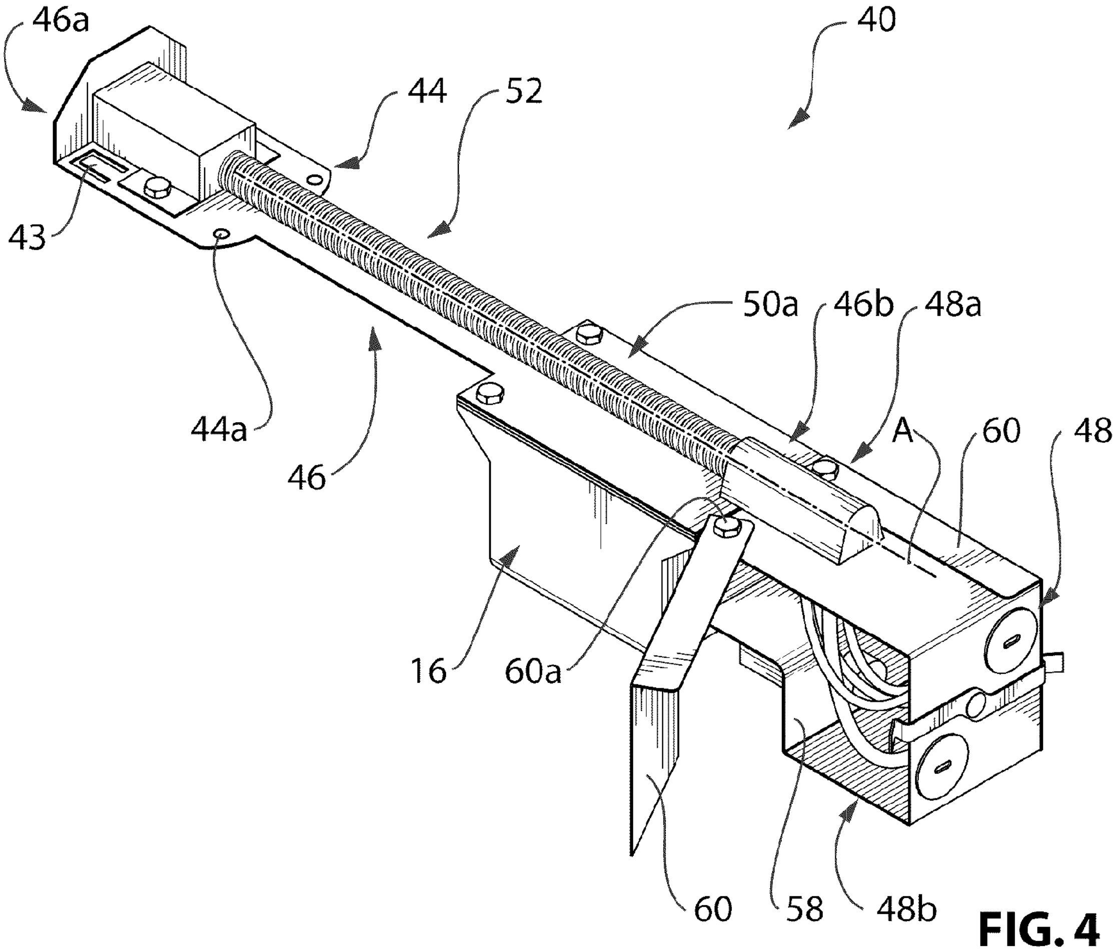
FIGS. 4 and 5 are perspective and side views, respectively, of a light fixture employing the transformer assembly of FIG. 1.
Figure 5:
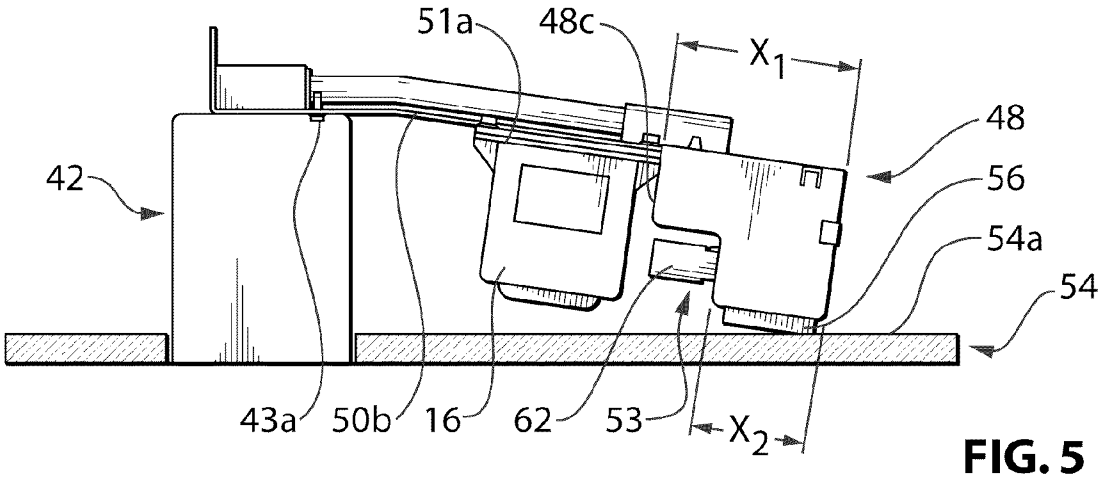

The transformer assembly 10 may, for instance, be used as part of a power supply assembly for a light fixture as shown at 40 in FIGS. 4 and 5. In this case, the light fixture 40 includes a light housing 42 and a frame portion 44 supporting the light housing 42, by way of a pair of anchoring flanges 43 and fasteners 43*a* which extend into passages 44*a*. The frame portion 44 includes an elongate flexible frame member 46 extending laterally outwardly from the light housing 42 along a first axis “A”. The elongate flexible frame member 46 includes a proximal end region 46*a* which is joined to the light housing 42 and a distal end region 46*b* supporting a junction box 48 mounted thereto.

The elongate flexible frame member 46 includes a first upper elongate surface 50*a* (as viewed in FIG. 5) and an opposed second lower elongate surface 50*b*. An expandable channel 52 extends between the light housing 42 and the junction box 48 along the first elongate surface 50*a* and provides an inner passageway for power cables between the light housing 42 and the junction box 48. In this case, the transformer unit 16 is mounted on the second elongate surface 50*b*.

Referring to FIG. 4, the junction box 48 has a first region 48*a* lying adjacent the distal end region 46*b* and a second region 48*b* lying remote from the distal end region 46*b*. Referring to FIG. 5, the junction box 48 has a first surface 48*c* in the direction of the light housing 42. The first region 48*a* has a first dimension X1 extending along an upper span of the junction box, as seen in FIGS. 4 and 5, and in line with the first axis A, while the second region has a second dimension X2 extending along a lower span of the junction box and also inline with the first dimension. In this case, the second dimension X2 is smaller than the first dimension to provide the first surface 48*c* with a stepped configuration to form a locating region 53 bordered on two sides by the first surface 48*c*.

The junction box 48 is also dimensioned so that the second region 48*b* lies adjacent an upper surface 54*a* of a ceiling panel 54 in an operative configuration. In this case, the junction box 48 includes a layer of resilient material 56 mounted on the second region 48*b* to cushion the junction box 48 in the operative position.

The junction box 48 includes a wall portion 58 adjacent the first surface 48*c*, with a thermo sensor 62 extending from the wall portion 58 into the locating region 53. This provides a convenient location for the thermo sensor 62 so that it is protected and while reducing the overall length of the light fixture that would otherwise occur if the thermo sensor was outwardly extending from the junction box in a direction away from the light housing 42.

The transformer unit 16, in this case, is located on the elongate flexible frame member 46 immediately adjacent the junction box 48. The junction box 48 has a pair of side walls 60 which are pivotally mounted for movement between a closed position, shown in FIG. 5, and an open position, shown in FIG. 4, by way of pivot members 60*a*. Thus, the transformer assembly 10 provides a magnetic potted transformer which is particularly useful for light fixture 40, otherwise known as a downlight frame. The die cast aluminum casing assists to minimize, if not eliminate, magnetic vibration noise. The transformer assembly provides a single casting which can be used for both 50VA and 75VA transformers, among others, as desired. A hole is provided at the bottom of the casing to be indicative that the transformer is sufficiently enclosed by the potting. A gasket is provided between the casing and a mounting plate to minimize noise transfer between the transformer and the casing.

The light fixture 40 implements the transformer assembly in one example and also provides a flexible conduit and channel to assist with the orientation of the assembly through ceiling hole and to ensure that that the junction box rests on the ceiling, in this case with no weight or torque being applied to the housing. The junction box is also provided with a gasket which comes into contact with ceiling to minimize, if not eliminate, any stray noise originating from the transformer and emitted through the casing, from transferring to the ceiling. The junction box also provides a pair of opposed covers which are held in the closed position by a spring. Thus, wing nuts or other fasteners are provided to secure the transformer assembly to the junction box to minimize, if not eliminate, vibration or noise transfer.

Figure 6:
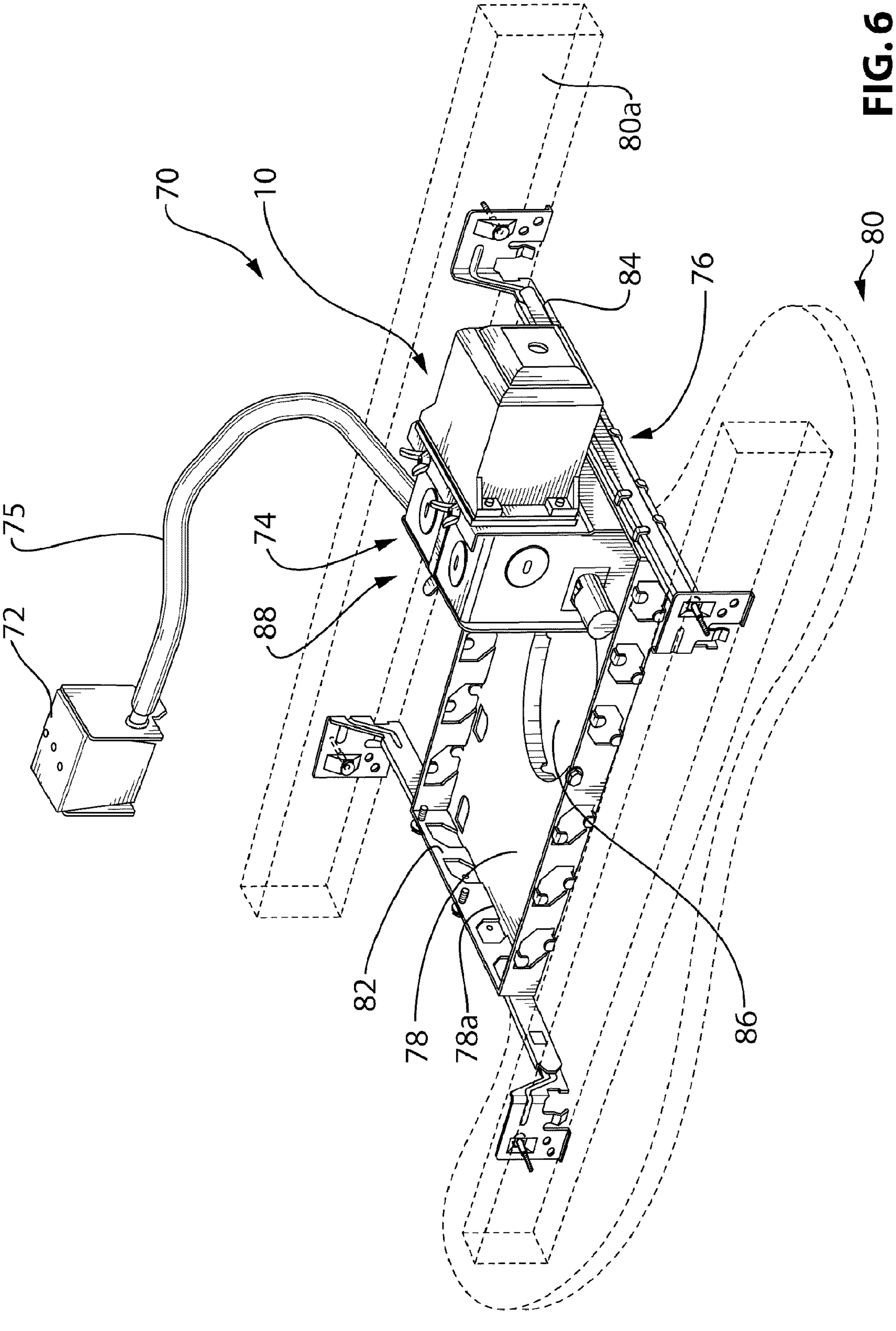
FIG. 6 is a perspective view of another light fixture employing the transformer assembly of FIG. 1.

Another exemplified light fixture is shown at 70 in FIG. 6. In this case, the light fixture has a light socket portion 72, a power supply assembly 74 to supply power to the light socket portion 72 by way of a flexible conduit 73 and a frame portion 76 supporting the power supply assembly 74. In this case, the power supply assembly 74 includes the transformer assembly 10.

The frame portion 76 includes a base plate 78 to be substantially parallel with a ceiling panel 80 in an operative position. The base plate 78 has a peripheral region 78*a* and a number of upstanding walls 82 extending along the peripheral region 78*a*. A pair of opposed strut members shown at 84 supports the base plate 78 between a pair of adjacent ceiling joists 80*a*. The base plate 78 has an access passage 86 to provide access to the light fixture. The power supply assembly 74 includes a junction box 88 adjacent the access passage 86. The access passage 86 is thus dimensioned to receive the transformer unit 10 therethrough.

Figure 7:
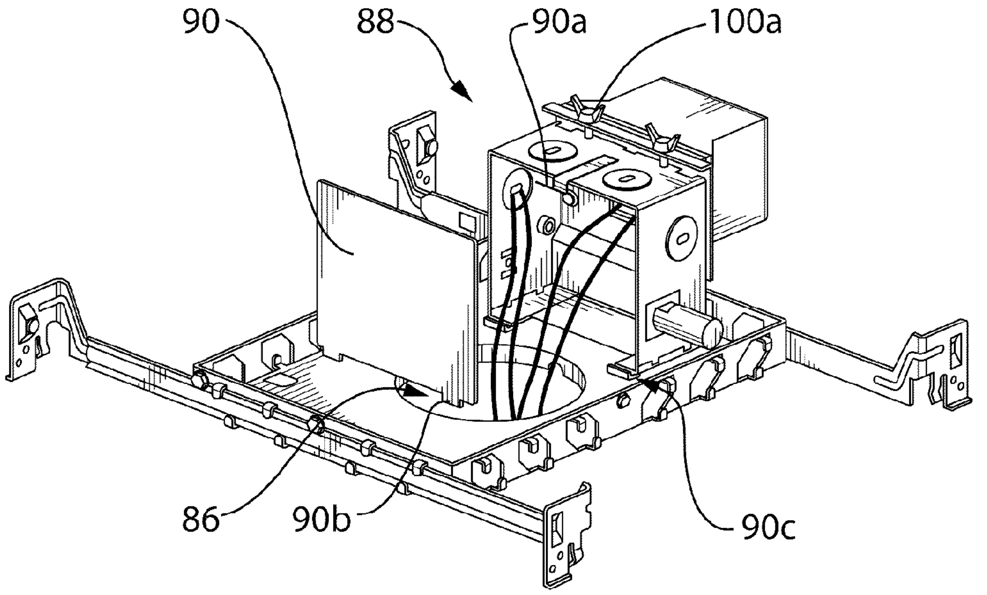
FIGS. 7 to 9 are perspective operational views of a method of servicing the light fixture of FIG. 6.
Figure 8:
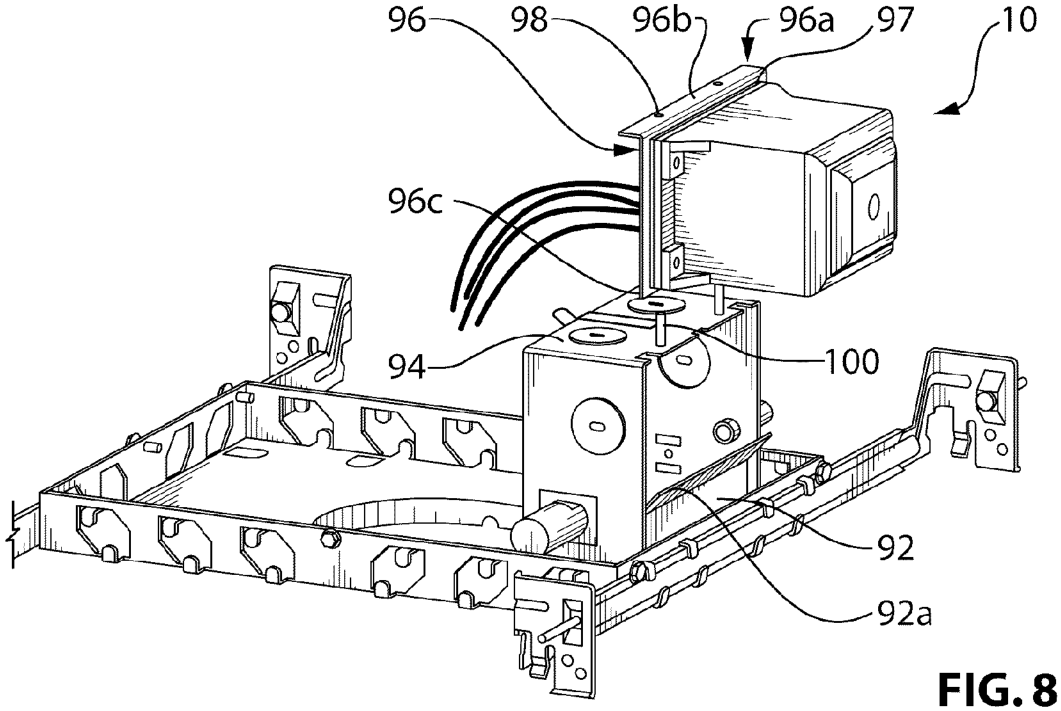
Figure 9:
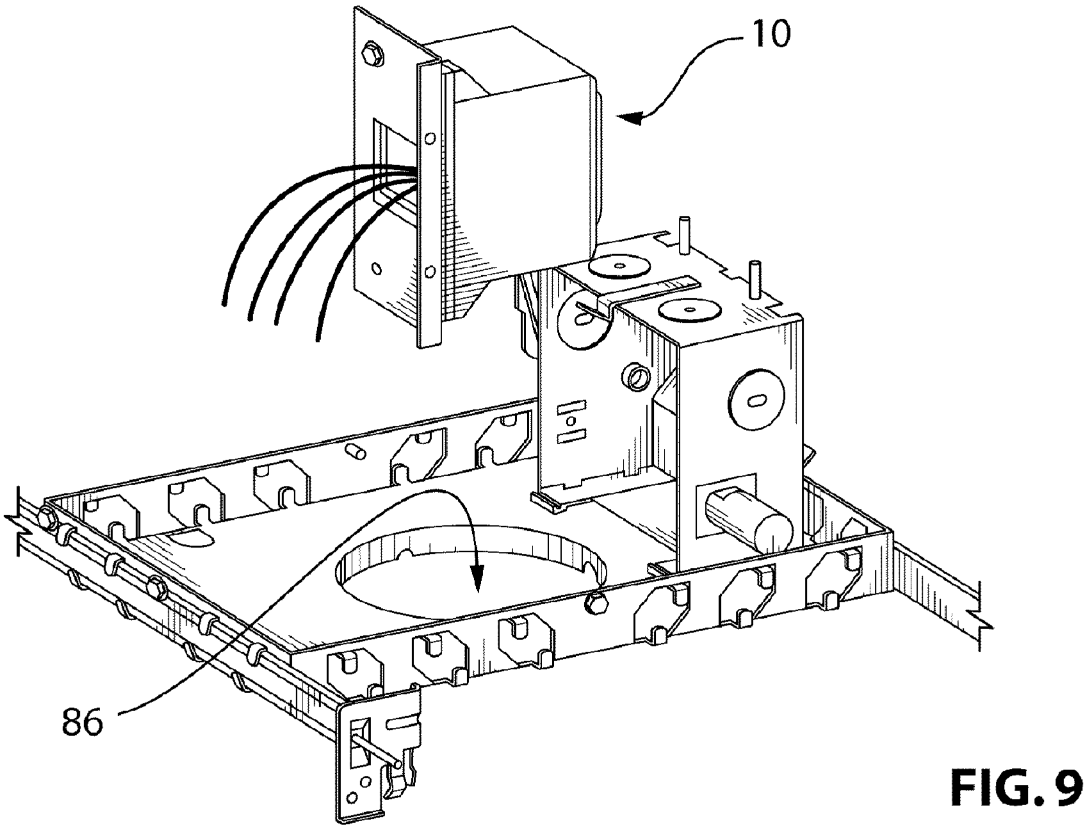

Referring to FIGS. 7 and 8, the junction box 88 has a pair of opposed side walls including a first proximal side wall 90 and a second distal side wall 92 and includes a top wall 94 between the first and second side walls 90, 92.

The transformer assembly 10 is mounted adjacent the second distal side wall 92. In this case, the transformer unit 10 is positioned on a mounting plate 96, with a gasket 97 therebetween. The mounting plate 96 has a first edge region 96*a* with a side wall portion 96*b* depending therefrom, the side wall portion being positioned on the top wall 94.

The mounting portion 96 includes a plurality of first anchor formations 98 to engage corresponding second anchor formations 100, in the form of studs, on the top wall. In this example, the first anchor formations include passages. The second anchor formations include threaded fasteners extending outwardly from the top wall to receive mating fasteners secured thereto, in this example wing nuts shown at 100*a*.

The mounting plate has a second edge region 96*c* opposite the first edge region. An anchor lip 92*a* extends along the second distal side wall 92 to receive the second edge region 96*c* to retain the mounting plate in position against the second distal side wall.

The first side wall 90 has a pair of anchor flanges 90*b* which fit in corresponding grooves 90*c*. The first side wall 90 is also removably mounted on the junction box, for example by way of a clip as shown at 90*a*, for manual removal therefrom by accessing the proximal side wall through the access passage 86.

Referring to FIG. 6, the light fixture 70 may thus be assembled by securing the strut members 84 to a selected pair of ceiling joists 80*a*, with the junction box 88 positioned adjacent the base plate 78 and the transformer unit 10 positioned on the junction box 88. During installation, a reflector (not shown) may be installed through the access passage 86 to receive a lamp (not shown). The lamp may in turn be electrically coupled with the socket portion 72.

The light fixture 70 thus provides a method of servicing a light fixture installation. First, the light fixture 70 is installed in a ceiling 80 with the frame portion 76 positioned to and fastened to adjacent ceiling joists 80*a* so that the base plate 78 is substantially parallel with an adjacent ceiling surface. Next, a light source is coupled with the power supply assembly 74 and then installed in place through the access passage. When the original (or first) potted transformer unit is to be replaced, a user may reach through the access passage 86 to a region above the base plate containing the junction box 88. As shown in FIG. 7, the first side wall 90 may then be removed from the junction box 88 to separate the electrical connections between the first potted transformer unit 10 and the junction box 88.

Figure 10:
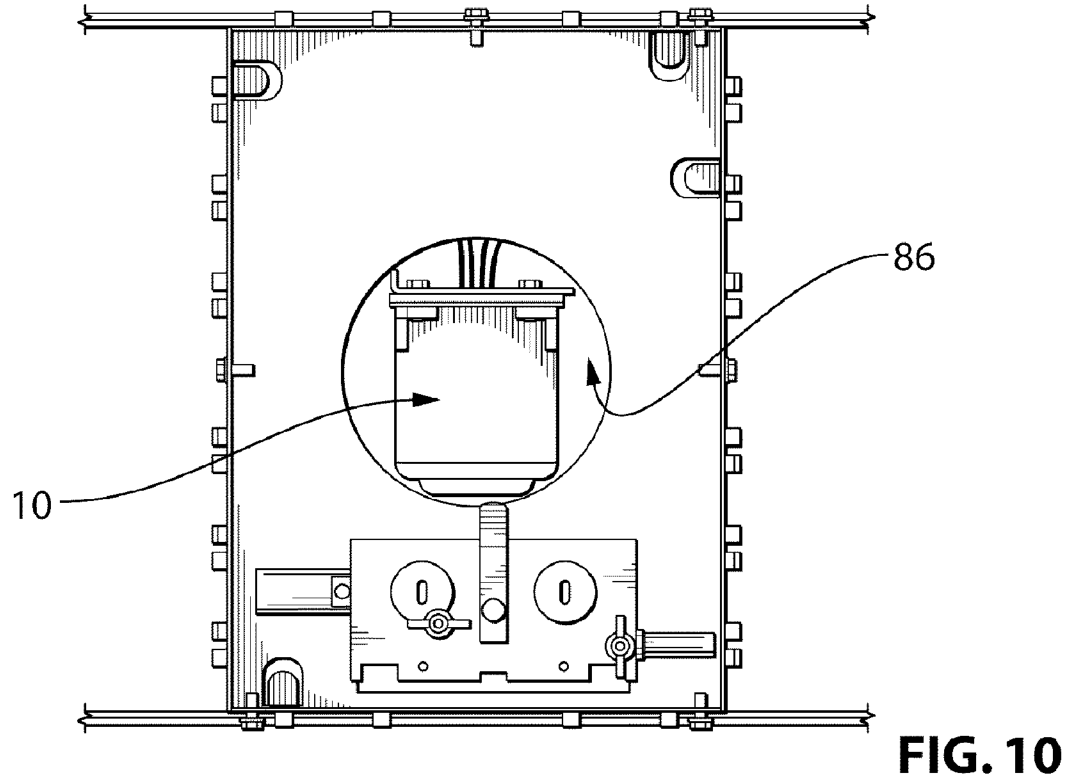
FIG. 10 is an operational plan view of a method of servicing the light fixture of FIG. 6.

Next, as shown in FIG. 8, the user may access the region of the junction box 88 which is adjacent the top wall 94 or second side wall 92 to dismount the first potted transformer unit 10 from the junction box 88. The user may then transfer or otherwise negotiate the first potted transformer unit 10 above and over the junction box 88 and down through the access passage 86, as shown in FIG. 10. The user may then select a second potted transformer unit and negotiate same through the access passage 86. The user may then access the region of the junction box 88 adjacent the top wall or second side wall to fasten connect the second potted transformer unit to the junction box. With the first side wall 90 still removed, the user may then access the junction box through the region of to establish an electrical connection between the second potted transformer unit and the junction box. The user may then removably couple the first side wall 90 to the junction box, by way of anchor clip 92*a*.

A gasket is also provided between the casing and mounting plate to minimize, if not eliminate, appreciable noise transfer.

While the gasket is believed to provided the benefit of additional shock absorption and noise suppression, there may be examples in which there may be other means of providing additional shock absorption and noise suppression, without the gasket member. If desired, the gasket may be formed with different configurations, provided sufficient passages are provided for the potting material to fill the interior cavity of the housing portion, that is to avoid undue obstruction between the guiding members 24.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A light fixture comprising a light housing, a power supply assembly to supply power to the light housing and a frame portion supporting the light housing and the power supply assembly, the power supply assembly including a potted transformer assembly including a housing portion to form an exterior transformer housing, a transformer unit dimensioned to fit within the housing portion, the housing portion including a first passage to receive the transformer unit in an operative position therein, the housing portion having an inner surface which is oriented to provide an interior cavity between the transformer unit and the inner surface, the interior cavity being dimensioned to receive a predetermined quantity of a potting compound, the housing portion further including a second passage in fluid communication with the interior cavity, the second passage being dimensioned to receive a portion of the potting compound therein, the second passage being located on the housing portion in such a manner that, following a transformer encapsulation step, the presence of potting compound in the second passage is indicative of the transformer being substantially encapsulated by the potting compound.

2. A light fixture as defined in claim 1, the frame portion including an elongate flexible frame member extending laterally outwardly from the light housing along a first axis, the elongate flexible frame member including a proximal end region joined to the light housing and a distal end region, a junction box mounted to the distal end region.

3. A light fixture as defined in claim 2, the elongate flexible frame member including a first elongate boundary and an opposed second elongate boundary, further comprising an expandable channel extending between the light housing and the junction box along the first elongate boundary, the transformer being mounted adjacent the second elongate boundary.

4. A light fixture as defined in claim 3, the junction box having a first region lying adjacent the distal end region and a second region lying remote from the distal end region, the junction box having a first surface in the direction of the light housing, the first region having a first dimension aligned with the first axis, the second region having a second dimension aligned with the first dimension, the second dimension being smaller than the first dimension to provide the first surface with a stepped configuration to form a locating region bordered on two sides by the first surface.

5. A light fixture as defined in claim 4, the junction box being dimensioned so that the second surface lies adjacent an upper surface of a ceiling panel in an operative configuration, the junction box including a layer of resilient material mounted on the second surface to cushion the junction box in the operative position.

6. A light fixture as defined in claim 5, the junction box including a wall portion adjacent the locating region, further comprising a thermo sensor extending from the wall portion into the locating region.

7. A light fixture as defined in claim 6, the transformer unit being located on the flexible frame member and immediately adjacent the junction box.

8. A light fixture as defined in claim 6, the junction box having a side wall which is pivotally mounted for movement between a closed position and an open position.

9. A light fixture comprising a light fixture, a power supply assembly to supply power to the light fixture and a frame portion supporting the power supply assembly, the power supply assembly including a potted transformer assembly including a housing portion to form an exterior transformer housing, a transformer unit dimensioned to fit within the housing portion, the housing portion including a first passage to receive the transformer unit in an operative position therein, the housing portion having an inner surface which is oriented to provide an interior cavity between the transformer unit and the inner surface, the interior cavity being dimensioned to receive a predetermined quantity of a potting compound, the housing portion further including a second passage in fluid communication with the interior cavity, the second passage being dimensioned to receive a portion of the potting compound therein, the second passage being located on the housing portion in such a manner that, following a transformer encapsulation step, the presence of potting compound in the second passage is indicative of the transformer being substantially encapsulated by the potting compound.

10. A light fixture as defined in claim 9, the frame portion including a base plate to be substantially parallel with ceiling panel in an operative position, the base plate having an access passage to provide access to the light fixture, the power supply assembly including a junction box adjacent the access passage, the junction box having a pair of opposed side walls, a first proximal side wall and a second distal side wall, the transformer assembly being mounted adjacent the second distal side wall, the junction box including a top wall between the first and second side walls.

11. A light fixture as defined in claim 10, further comprising a mounting plate, the transformer unit being positioned on the mounting plate, the mounting plate having a first edge region with a side wall portion depending therefrom, the side wall being positioned on the top wall.

12. A light fixture as defined in claim 11, the mounting plate having a second edge region opposite the first edge region, further comprising an anchor lip extending along the second distal side wall to receive the second edge region to retain the mounting plate in position against the second distal side wall.

13. A light fixture as defined in claim 11, the mounting portion including a plurality of first anchor formations to engage corresponding second anchor formations on the top wall.

14. A light fixture as defined in claim 12, the first anchor formations including passages, the second anchor formations including threaded fasteners extending outwardly from the top wall to receive complementary fasteners secured thereto.

15. A light fixture as defined in claim 13, the access passage being dimensioned to receive the transformer unit therethough.

16. A light fixture as defined in claim 14, proximal side wall being removably mounted on the junction box for manual removal therefrom by accessing the proximal side wall through the access passage.

* * * * *